(12) United States Patent
Watanabe et al.

(10) Patent No.: US 11,614,201 B2
(45) Date of Patent: Mar. 28, 2023

(54) LUBRICATING OIL TANK AND ROTATING MACHINE SYSTEM

(71) Applicant: MITSUBISHI HEAVY INDUSTRIES COMPRESSOR CORPORATION, Tokyo (JP)

(72) Inventors: Takuya Watanabe, Hiroshima (JP); Jun Nagashima, Hiroshima (JP); Masahiro Kobayashi, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 458 days.

(21) Appl. No.: 16/855,295

(22) Filed: Apr. 22, 2020

(65) Prior Publication Data

US 2020/0340621 A1 Oct. 29, 2020

(30) Foreign Application Priority Data

Apr. 26, 2019 (JP) .............................. JP2019-086585

(51) Int. Cl.
  *F16N 39/00* (2006.01)
  *B01D 19/00* (2006.01)
  *F16N 19/00* (2006.01)

(52) U.S. Cl.
  CPC ....... *F16N 39/002* (2013.01); *B01D 19/0047* (2013.01); *F16N 19/00* (2013.01); *F16N 2210/02* (2013.01); *F16N 2210/14* (2013.01)

(58) Field of Classification Search
  CPC .... F16N 19/00; F16N 39/002; F16N 2210/02; B01D 19/0047; B01D 19/0015; B01D 19/0042; B01D 19/0068
  See application file for complete search history.

(56) References Cited

U.S. PATENT DOCUMENTS 1,752,215 A * 3/1930 Waters ............... B01D 19/0057
                                                    96/188
2,535,689 A * 12/1950 McMahan ............... F01D 25/18
                                                    184/6.28

(Continued)

FOREIGN PATENT DOCUMENTS

JP       S49102571 A    9/1974
JP       S55-080010 U   6/1980

(Continued)

OTHER PUBLICATIONS

Notice of Reasons for Refusal in corresponding Japanese Application No. 2019-086585, dated Aug. 30, 2022 (8 pages).

*Primary Examiner* — Michael R Mansen
*Assistant Examiner* — Mark K Buse
(74) *Attorney, Agent, or Firm* — Osha Bergman Watanabe & Burton LLP

(57) ABSTRACT

A lubricating oil tank includes: a tank casing having an introduction part into which lubricating oil is introduced and a discharge part through which the lubricating oil is discharged; a plurality of receiving parts which are disposed between the introduction part and the discharge part in the tank casing and which is configured to receive the lubricating oil introduced from the introduction part: and a lubricating oil delivery part which is configured to deliver the lubricating oil from one of the plurality of receiving parts to another one of the plurality of receiving parts between the plurality of receiving parts.

6 Claims, 6 Drawing Sheets

(56) References Cited

U.S. PATENT DOCUMENTS

| | | | | | |
|---|---|---|---|---|---|
| 2,695,679 | A | * | 11/1954 | Hoffman | F16N 39/002 96/205 |
| 2,944,966 | A | * | 7/1960 | Eickmeyer | B01D 5/0036 159/13.4 |
| 3,555,819 | A | * | 1/1971 | Burnham, Sr. | E21B 21/067 96/198 |
| 3,789,579 | A | * | 2/1974 | El-Hindi | C10M 175/0025 208/185 |
| 3,879,286 | A | * | 4/1975 | Berriman | B01D 33/72 210/345 |
| 4,512,783 | A | * | 4/1985 | Stevenson | B01D 19/0042 96/407 |
| 6,341,667 | B1 | * | 1/2002 | Ahlbom | F16N 7/40 96/219 |
| 2015/0360148 | A1 | * | 12/2015 | Loviat | B01D 19/0036 203/30 |
| 2017/0232365 | A1 | * | 8/2017 | Phillips | B01D 21/2416 210/767 |
| 2018/0023762 | A1 | * | 1/2018 | Kato | F01D 25/18 184/6.4 |
| 2019/0321754 | A1 | * | 10/2019 | Justl | B67C 3/22 |

FOREIGN PATENT DOCUMENTS

| | | |
|---|---|---|
| JP | S60-053304 U | 4/1985 |
| JP | S63-44446 A | 2/1988 |
| JP | H02-057107 U | 4/1990 |
| JP | 2012-177341 A | 9/2012 |

\* cited by examiner

LUBRICATING OIL TANK AND ROTATING MACHINE SYSTEM

BACKGROUND

Technical Field

The statements in this section merely provide background information related to the present disclosure and do not necessarily constitute prior art.

The present disclosure relates to a lubricating oil tank and a rotating machine system.

For example, Japanese Patent Application No. 2019-086585, filed on Apr. 26, 2019, discloses the lubricating oil tank and the rotating machine system. It is incorporated herein by reference.

Description of Related Art

Rotors of rotating machines such as a compressor, a turbine, and a motor are rotatably supported through bearings. The bearing is supplied with lubricating oil sent from a lubricating oil tank by a pump or the like. The lubricating oil that has lubricated the bearing is discharged from the bearing, collected in the lubricating oil tank, and then supplied to the bearing again by the pump or the like.

Incidentally, the lubricating oil flowed back from the bearing into the lubricating oil tank contains air bubbles. If the lubricating oil containing the air bubbles is supplied to the bearing again, there is a possibility that the lubricating performance may be impaired. For this reason, the lubricating oil is caused to stay in the lubricating oil tank, and the air bubbles contained in the lubricating oil are separated by gravity and degassed. However, in order to secure a sufficient time required for the air bubbles to be separated, it is necessary to lengthen the residence time of the lubricating oil in the lubricating oil tank. In order to cause the lubricating oil to stay for a long time, it is effective to increase the capacity of the lubricating oil tank. However, this leads to an increase in the size of the lubricating oil tank.

On the other hand, Japanese Unexamined Patent Application, First Publication No. 2012-177341 discloses a configuration including air bubble passage preventing means such as a mesh-like filter member or a baffle plate in order to prevent passage of air bubbles contained in lubricating oil which flows back into a lubricating oil tank.

SUMMARY

However, even if the air bubble passage preventing means as described above is provided, it is difficult to remove the air bubbles in a short time and with high accuracy. Therefore, it is desired to remove the air bubbles contained in the lubricating oil in a short time and with high accuracy.

The present disclosure provides a lubricating oil tank and a rotating machine system in which it is possible to remove air bubbles contained in lubricating oil in a short time and with high accuracy.

A lubricating oil tank according to a first aspect of the present disclosure includes: a tank casing having an introduction part into which lubricating oil is introduced and a discharge part through which the lubricating oil is discharged; a plurality of receiving parts which are disposed between the introduction part and the discharge part in the tank casing and which is configured to receive the lubricating oil introduced from the introduction part: and a lubricating oil delivery part which is configured to deliver the lubricating oil from one of the plurality of receiving parts to another one of the plurality of receiving parts between the plurality of receiving parts.

With such a configuration, the lubricating oil introduced into the tank casing from the introduction part sequentially passes through the plurality of receiving parts and is then sent out from the discharge part. In the process in which the lubricating oil flows through the receiving part, air bubbles gradually escape, so that the content of the air bubbles gradually decreases. Further, by passing through the plurality of receiving parts, it is possible to sufficiently secure a time required for the air bubbles to be removed from the lubricating oil. Therefore, the air bubbles contained in the lubricating oil can be more reliably removed. Further, the plurality of receiving parts are provided, whereby the amount of the lubricating oil which is degassed in one receiving part is reduced compared to a case where a plurality of receiving parts are not provided and lubricating oil is collectively stored in the tank casing. Therefore, in each receiving part, the speed at which the air bubbles escape from the lubricating oil (degassing speed) increases.

Further, in a lubricating oil tank according to a second aspect of the present disclosure, in the first aspect, the plurality of receiving parts may be oil trays that is configured to store the lubricating oil, and be disposed at intervals with respect to one another in a vertical direction.

The receiving part is used as an oil tray, whereby the air bubbles sequentially escape from the liquid level of the lubricating oil in the stored state into the atmosphere by gravity (a difference in specific gravity between the lubricating oil and the air bubbles). Therefore, the time required for the air bubbles to escape from the lubricating oil can be sufficiently secured with a simple configuration. Further, the plurality of receiving parts are disposed in the vertical direction, whereby the size of the lubricating oil tank in the horizontal direction can be reduced. For this reason, it is possible to suppress an increase in the size of the lubricating oil tank while increasing the degassing speed.

Further, in a lubricating oil tank according to a third aspect of the present disclosure, in the second aspect, at least one of the plurality of receiving parts may further include a partition plate which extends downward from above a liquid level of the lubricating oil in at least one of the plurality of receiving parts in the vertical direction and is disposed with a gap between the partition plate and a bottom surface of at least one of the plurality of receiving parts in the vertical direction.

By providing the partition plate in the receiving part, it is possible to suppress sway of the lubrication oil in the receiving part due to vibration or the like from the outside. Further, in the receiving part, many air bubbles are present in an upper layer portion of the lubricating oil in the stored state due to gravity, and the content of the air bubbles in a lower layer portion is reduced. The lubricating oil flows from the upstream side to the downstream side in a flow direction of the lubricating oil with respect to the partition plate through the gap between the partition plate and the bottom surface of the receiving part. Therefore, the lubricating oil having a small content of air bubble can be efficiently sent to the downstream side in the flow direction of the lubricating oil in the receiving part.

Further, in a lubricating oil tank according to a fourth aspect of the present disclosure, in the second aspect or the third aspect, the lubricating oil delivery part may have an overflow portion which is formed in the one of the plurality of receiving parts, and in which the lubricating oil is configured to flow out when a liquid level of the lubricating oil in the one of the plurality of receiving parts reaches a predetermined level, and an oil receiving portion which is formed in another one of the plurality of receiving parts disposed below the one of the plurality of receiving parts in the vertical direction and is configured to receive the lubricating oil flowing out from the overflow portion.

With such a configuration, the lubricating oil that has gotten over the overflow portion from one receiving part flows down to the oil receiving portion of another receiving part. In one receiving part, the lubricating oil gets over the overflow portion according to the flow rate of the lubricating oil flowing into the one receiving part. Therefore, a stable flow rate of lubricating oil can be sequentially delivered from one receiving part to another receiving part.

Further, in a lubricating oil tank according to a fifth aspect of the present disclosure, in any one of the first to fourth aspects, at least one of the plurality of receiving parts may include a plurality of small receiving parts disposed side by side in a horizontal direction.

With such a configuration, the amount of lubricating oil which is processed in each of the small receiving parts is reduced compared to a case where one receiving part is provided. In this way, it is possible to further suppress the sway of the lubricating oil which is processed in the small receiving part due to vibration or the like from the outside.

Further, in a lubricating oil tank according to a sixth aspect of the present disclosure, in the first aspect, the plurality of receiving parts may be disposed at intervals therebetween in a vertical direction, the one of the plurality of receiving parts has a first inclined surface inclined from an upper side toward a lower side in the vertical direction, another one of the plurality of receiving parts disposed below the one of the plurality of receiving parts in the vertical direction has a second inclined surface inclined from an upper side toward a lower side in the vertical direction so as to incline in a different direction from the first inclined surface, and an upper end portion of the second inclined surface may be disposed below a lower end portion of the first inclined surface in the vertical direction.

With such a configuration, in the process of passing through the plurality of receiving parts, the lubricating oil flows on the first inclined surface or the second inclined surface with the minimum film thickness. In the process in which the lubricating oil flows on the first inclined surface or the second inclined surface, air bubbles gradually escape. The film thickness (minimum film thickness) of the lubricating oil flowing on the first inclined surface or the second inclined surface is significantly smaller than that in a case where the lubricating oil is stored, so that the air bubbles can efficiently escape. Therefore, the degassing speed can be greatly increased.

A rotating machine system according to a seventh aspect of the present disclosure includes: a rotating machine main body; and the lubricating oil tank according to any one of the first to sixth aspects, which is configured to store lubricating oil which is supplied to the rotating machine main body.

According to the present disclosure, it is possible to remove the air bubbles contained in the lubricating oil in a short time and with high accuracy.

DETAILED DESCRIPTION OF EMBODIMENTS

Hereinafter, embodiments for implementing a lubricating oil tank and a rotating machine system according to the present disclosure will be described with reference to the drawings. However, the present disclosure is not limited to only these embodiments.

First Embodiment

Figure 1:
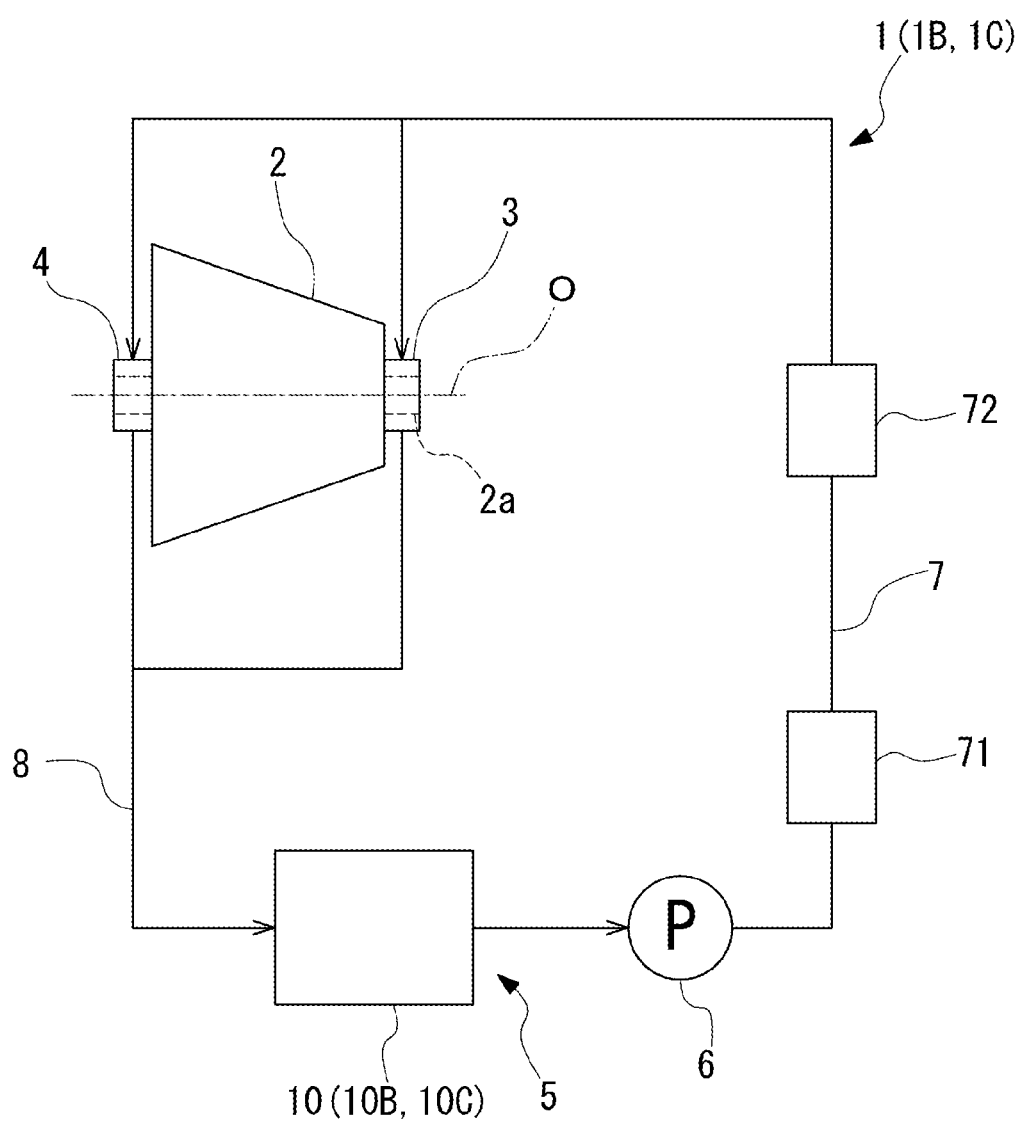
FIG. 1 is a schematic diagram showing a schematic configuration of a compressor system according to an embodiment of the present disclosure.

FIG. 1 is a schematic diagram showing a schematic configuration of a compressor system according to an embodiment of the present disclosure. As shown in FIG. 1, a compressor system (a rotating machine system) 1 of this embodiment includes a compressor main body (a rotating machine main body) 2, and a lubricating oil supply device 5 that supplies lubricating oil to the compressor main body 2.

The compressor main body 2 has a rotor 2a. The compressor main body 2 is provided with bearings 3 and 4 that support the rotor 2a so as to be rotatable around a central axis O of the rotor 2a.

The lubricating oil supply device 5 includes a lubricating oil tank 10, a pump 6, a feed pipe 7, and a return pipe 8. The lubricating oil tank 10 stores lubricating oil which is supplied to the compressor main body 2. The pump 6 supplies the lubricating oil stored in the lubricating oil tank 10 to the feed pipe 7. An oil cooler 71 and an oil filter 72 are disposed in the feed pipe 7. The oil cooler 71 cools the lubricating oil supplied from the pump 6. The oil filter 72 removes foreign matters such as dust or the like mixed in the lubricating oil discharged from the oil cooler 71. The lubricating oil supplied from the pump 6 to the feed pipe 7 and passed through the oil cooler 71 and the oil filter 72 is supplied to the bearings 3 and 4. The lubricating oil used for lubrication in the bearings 3 and 4 is returned to the lubricating oil tank 10 through the return pipe 8.

Figure 2:
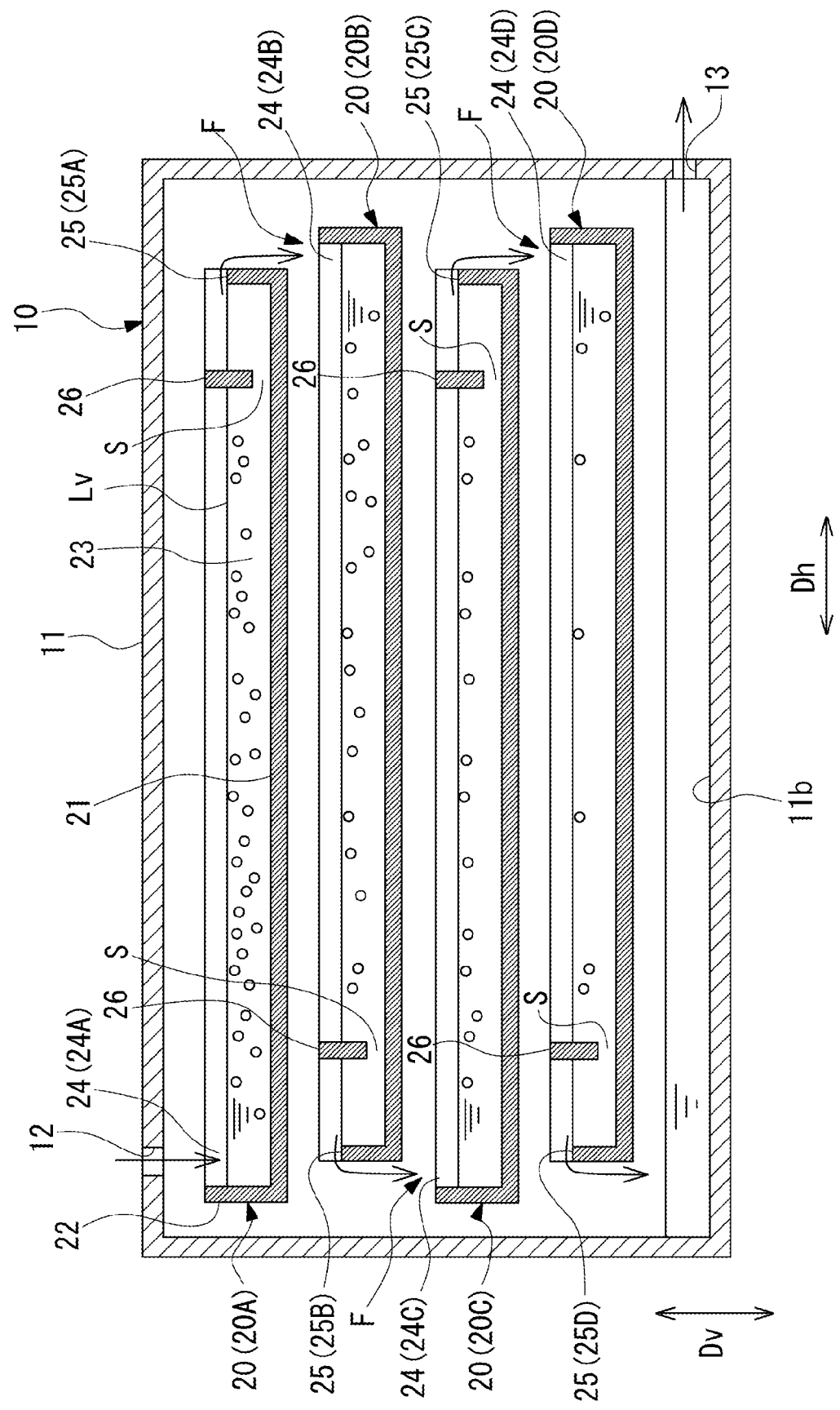
FIG. 2 is a sectional view showing a configuration of a lubricating oil tank according to a first embodiment of the present disclosure.

FIG. 2 is a sectional view showing a configuration of a lubricating oil tank according to a first embodiment of the present disclosure. As shown in FIG. 2, the lubricating oil tank 10 includes a tank casing 11, a plurality of oil trays (receiving parts) 20, and a lubricating oil delivery part F.

The tank casing 11 has a hollow box shape. The tank casing 11 is provided with an introduction part 12 into which the lubricating oil is introduced from the return pipe 8 and a discharge part 13 through which the lubricating oil is discharged to the pump 6.

The plurality of oil trays 20 are disposed between the introduction part 12 and the discharge part 13 in the tank casing 11. The plurality of oil trays 20 are disposed so as to be stacked at intervals with respect to one another in a vertical direction Dv. In this embodiment, for example, four oil trays 20 are provided. Specifically, in the tank casing 11, a first oil tray 20A, a second oil tray 20B, a third oil tray 20C, and a fourth oil tray 20D are disposed in order from above in the vertical direction Dv. The first oil tray 20A is disposed at the uppermost position in the vertical direction Dv among the plurality of oil trays 20.

The second oil tray 20B is disposed one step below the first oil tray 20A in the vertical direction Dv. The second oil tray 20B is disposed to be shifted in a horizontal direction Dh with respect to the first oil tray 20A.

The third oil tray 20C is disposed one step below the second oil tray 20B in the vertical direction Dv. The third oil tray 20C is disposed to be shifted in the horizontal direction Dh with respect to the second oil tray 20B. The third oil tray 20C is disposed at the same position as the first oil tray 20A when viewed from above in the vertical direction Dv.

The fourth oil tray 20D is disposed at the lowest position in the vertical direction Dv among the plurality of oil trays 20. The fourth oil tray 20D is disposed apart from a bottom portion 11b of the tank casing 11 in the vertical direction Dv. The fourth oil tray 20D is disposed to be shifted in the horizontal direction Dh with respect to the third oil tray 20C. The fourth oil tray 20D is disposed at the same position as the second oil tray 20B when viewed from above in the vertical direction Dv.

The oil tray 20 is made to be capable of storing the lubricating oil which is supplied from above in the vertical direction Dv. Specifically, the oil tray 20 has a bottom surface 21 having a rectangular plate shape, and a peripheral wall portion 22 extending in a rectangular plate shape upward in the vertical direction Dv from an outer peripheral portion of the bottom surface 21. That is, the oil tray 20 has a bottomed box shape. The oil tray 20 forms an oil storage space part 23, in which the lubricating oil can be stored, by the bottom surface 21 and the peripheral wall portion 22.

The oil tray 20 has an overflow portion 25. The overflow portion 25 is formed by recessing a part of the peripheral wall portion 22 downward from the upper surface in the vertical direction Dv. In other words, the overflow portion 25 is a cutout formed in the peripheral wall portion 22. The overflow portion 25 is formed at one of the peripheral wall portions 22 extending from the bottom surface 21. That is, in the peripheral wall portion 22 in which the overflow portion 25 is formed, the height thereof from the bottom surface 21 in the vertical direction Dv is lower than the other three peripheral wall portions 22 in which the overflow portion 25 is not formed. The lubricating oil stored in the oil storage space part 23 gets over the peripheral wall portion 22 in which the overflow portion 25 is formed, if the liquid level of the lubricating oil becomes equal to or higher than a predetermined level, that is, the height of the peripheral wall portion 22 in which the overflow portion 25 is formed. In this way, the lubricating oil flows out from the oil tray 20 and flows downward in the vertical direction Dv.

The oil tray 20 has an oil receiving portion 24. The oil receiving portion 24 receives the supplied lubricating oil and leads it to the oil storage space part 23. In each of the oil trays 20, the oil receiving portion 24 is disposed on the side opposite to the overflow portion 25 in the horizontal direction Dh. That is, the oil receiving portion 24 is a region facing the peripheral wall portion 22 opposite to the peripheral wall portion 22 in which the overflow portion 25 is formed.

An oil receiving portion (first oil receiving portion) 24A of the first oil tray 20A directly receives the lubricating oil which is introduced into the tank casing 11 from the introduction part 12. An oil receiving portion (second oil receiving portion) 24B of the second oil tray 20B is disposed at the position shifted in the horizontal direction Dh below the overflow portion (first overflow portion) 25A of the first oil tray 20A located above in the vertical direction Dv. The second oil receiving portion 24B directly receives the lubricating oil flowing down over the first overflow portion 25A.

An oil receiving portion (third oil receiving portion) 24C of the third oil tray 20C is disposed at the position shifted in the horizontal direction Dh below the overflow portion (second overflow portion) 25B of the second oil tray 20B located above in the vertical direction Dv. The third oil receiving portion 24C directly receives the lubricating oil flowing down over the second overflow portion 25B. An oil receiving portion (fourth oil receiving portion) 24D of the fourth oil tray 20D is disposed at the position shifted in the horizontal direction Dh below the overflow portion (third overflow portion) 25C of the third oil tray 20C in the vertical direction Dv. The fourth oil receiving portion 24D directly receives the lubricating oil that flowing down over the third overflow portion 25C. The lubricating oil flowing down over a fourth overflow portion 25D is stored in the bottom portion 11b of the tank casing 11.

The overflow portion 25 and the oil receiving portion 24 configure the lubricating oil delivery part F that delivers the lubricating oil between the oil trays 20 disposed to be arranged up and down. The lubricating oil delivery part F delivers the lubricating oil from one oil tray 20 disposed in an upper stage so as to be located on the upstream side in the flow direction of the lubricating oil to another oil tray 20 disposed in a lower stage so as to be located on the downstream side in the flow direction of the lubricating oil. That is, the lubricating oil delivery part F is composed of the overflow portion 25 provided in the upper stage oil tray 20 and the oil receiving portion 24 provided in the lower stage oil tray 20.

In the oil tray 20, the lubricating oil flows out from the overflow portion 25 according to the flow rate of the lubricating oil received in the oil receiving portion 24. In the oil tray 20, the lubricating oil flows from the oil receiving portion 24 toward the overflow portion 25.

The oil tray 20 has a partition plate 26 between the oil receiving portion 24 and the overflow portion 25. The partition plate 26 extends from above a liquid level Lv of the lubricating oil that can be stored in the oil tray 20 in the vertical direction Dv toward below the liquid level Lv in the vertical direction Dv. The partition plate 26 is disposed with a gap S between the partition plate 26 and the bottom surface 21 of the oil tray 20 in the vertical direction Dv. The partition plate 26 is fixed to a pair of peripheral wall portions 22 connected to the end portions of the peripheral wall portion 22 in which the overflow portion 25 is formed. The partition plate 26 is disposed at the position closer to the overflow portion 25 than the oil receiving portion 24 in the flow direction of the lubricating oil flowing through the oil storage space part 23.

According to the lubricating oil tank 10 and the compressor system 1 as described above, the lubricating oil introduced into the tank casing 11 from the introduction part 12 sequentially passes through the plurality of oil trays 20, is then stored on the bottom portion 11b of the tank casing 11, and is sent out from the discharge part 13. In each of the oil trays 20, while the lubricating oil gradually flows from the oil receiving portion 24 to the overflow portion 25, air bubbles gradually escape. Specifically, in the oil tray 20, the air bubbles sequentially escape from the liquid level Lv of the stored lubricating oil into the atmosphere due to gravity (a difference in specific gravity between the lubricating oil and the air bubbles). In this way, many air bubbles are present in an upper layer portion of the lubricating oil in the oil tray 20, and the content of the air bubbles in a lower layer portion is reduced. Further, in the process in which the lubricating oil flows from the oil receiving portion 24 toward the overflow portion 25 in the oil tray 20, the air bubbles gradually escape, so that the content of the air bubbles is gradually reduced. The lubricating oil flows from the oil receiving portion 24 side of the partition plate 26 to the overflow portion 25 side through the gap S between the partition plate 26 and the bottom surface 21. In other words, the lubricating oil having a small content of air bubbles is sent to the vicinity of the overflow portion 25 downstream of the partition plate 26, and is delivered from the overflow portion 25 to the oil tray 20 on the lower stage side.

Further, the plurality of oil trays 20 are provided, whereby the volume of the lubricating oil which is degassed in one oil tray 20 is reduced compared to a case where the plurality of oil trays 20 are not provided and the lubricating oil is collectively stored in the tank casing 11. Further, the depth from the bottom surface 21 to the liquid level Lv of the lubricating oil in each oil tray 20 becomes shallow. Therefore, the time required for the air bubbles to reach the liquid level Lv is shortened, and thus, in each oil tray 20, the speed at which the air bubbles escape from the lubricating oil (degassing speed) increases.

Further, the lubricating oil passes through the plurality of oil trays 20 from the introduction part 12 to the discharge part 13. In the oil tray 20, degassing can be performed only by storing the lubricating oil. Therefore, the time required for the air bubbles to escape from the lubricating oil can be sufficiently secured with a simple configuration. Therefore, the air bubbles contained in the lubricating oil can be more reliably removed.

Further, the lubricating oil that has gotten over the overflow portion 25 from the upper stage oil tray 20 flows down to the oil receiving portion 24 of the lower stage oil tray 20. In the upper stage oil tray 20, the lubricating oil gets over the overflow portion 25 according to the flow rate of the lubricating oil which has flowed into the upper stage oil tray 20. Therefore, a stable flow rate of lubricating oil can be sequentially delivered from the upper stage oil tray 20 to the lower stage oil tray 20.

Further, the partition plate 26 is provided in the oil tray 20, whereby it is possible to suppress the sway of the lubricating oil stored in the oil tray 20 due to vibration or the like from the outside. Further, the lubricating oil of the lower layer portion having a small content of air bubbles flows from the upstream side to the downstream side with respect to the partition plate 26 through the gap S between the partition plate 26 and the bottom surface 21. Therefore, the lubricating oil having a small content of air bubbles can be efficiently sent to the downstream side in the flow direction of the lubricating oil in the oil tray 20.

Further, the plurality of oil trays 20 are stacked in the vertical direction Dv. In this way, the size of the lubricating oil tank 10 in the horizontal direction Dh can be reduced. Therefore, it is possible to suppress an increase in the size of the lubricating oil tank 10 while increasing the degassing speed.

(First Modification Example of First Embodiment)

Figure 3:
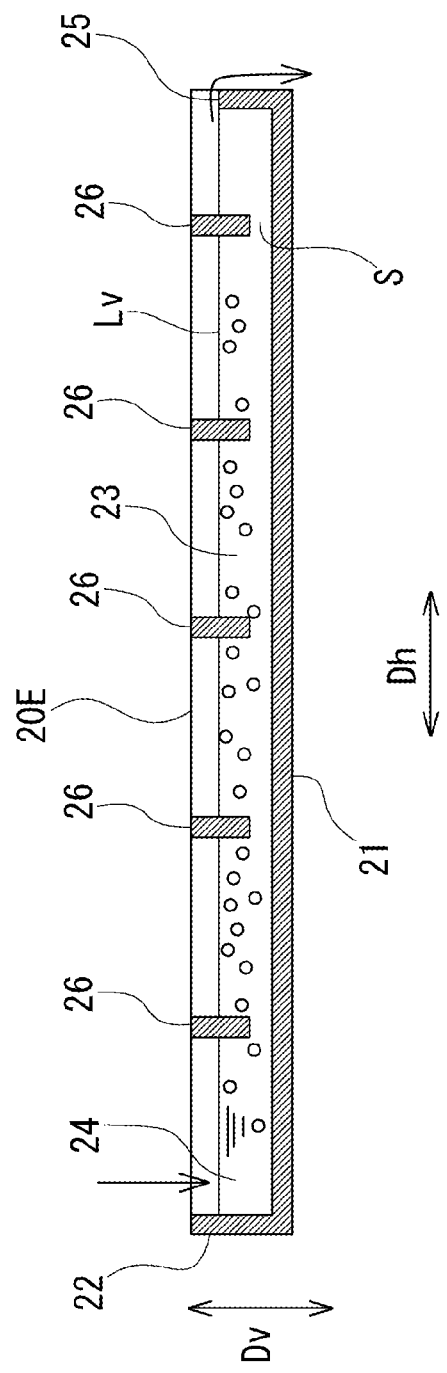
FIG. 3 is a sectional view showing a first modification example of an oil tray according to the first embodiment.

In the first embodiment, only one partition plate 26 is provided between the oil receiving portion 24 and the overflow portion 25. However, the number of the partition plates 26 is not limited to one. For example, as shown in FIG. 3, an oil tray (receiving part) 20E may be provided with a plurality of (in the drawing, five) partition plates 26 between the oil receiving portion 24 and the overflow portion 25.

The plurality of partition plates 26 are provided, whereby the oil storage space part 23 in the oil tray 20E is divided into a plurality of oil storage space parts in the horizontal direction Dh. In this way, even if the lubricating oil tank sways due to vibration or the like from the outside, it is possible to suppress the sway of the stored lubricating oil. Further, the lubricating oil passes through the gaps S between the plurality of partition plates 26 and the bottom surface 21 many times. For this reason, much of the lubricating oil of the lower layer portion, which has a small content of air bubbles, can be sent to the downstream side in the flow direction of the lubricating oil in the oil tray 20.

(Second Modification Example of First Embodiment)

Figure 4:
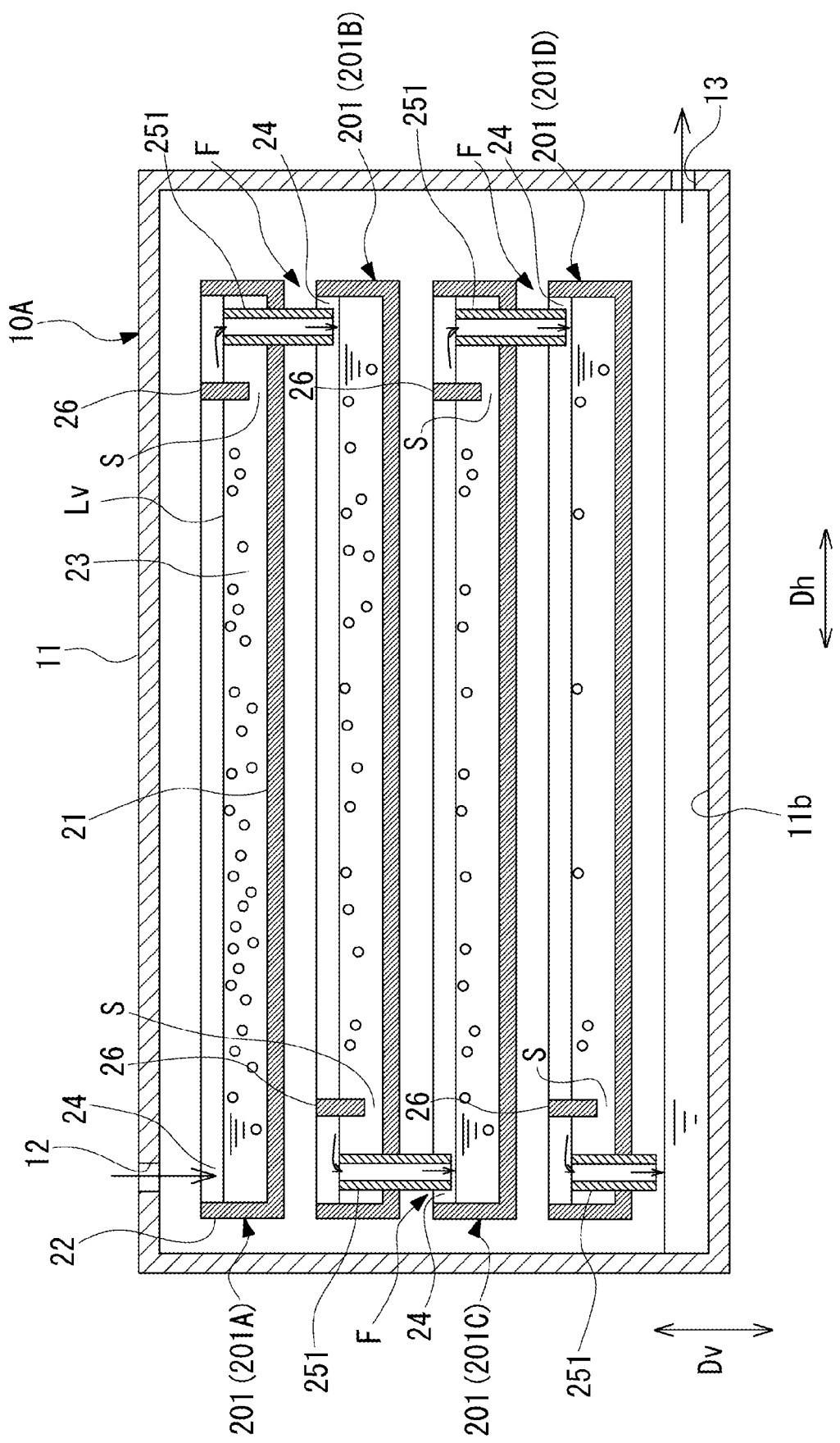
FIG. 4 is a sectional view showing a second modification example of the oil tray according to the first embodiment.

In the first embodiment, the overflow portion 25 is formed by recessing a part of the peripheral wall portion 22. However, there is no limitation to such a structure. The overflow portion may be configured such that the lubricating oil flows out to the lower oil tank when the liquid level of the lubricating oil reaches a predetermined level. For example, as shown in FIG. 4, an overflow portion 251 of a second modification example may be formed by a pipe that is a tubular member. In the second modification example, the position of the opening at the upper end of the overflow portion 251 is disposed to be the same position as the liquid level Lv of the lubricating oil that can be stored in an oil tray 201. The position of the opening at the lower end of the overflow portion 251 passes through the bottom surface 21 of the oil tray 201 and is disposed on another oil tank 201 disposed below. Therefore, in the second modification example, the heights (the distances from the bottom surface 21) of all the peripheral wall portions 22 are constant.

The overflow portion 251 as described above is provided, whereby unlike the first embodiment, the plurality of oil trays 201 of the second modification example can be disposed without shifting the position in the horizontal direction Dh. That is, in order downward from a first oil tray 201A disposed at the uppermost position in the vertical direction Dv a second oil tray 201B, a third oil tray 201C, and a fourth oil tray 201D can be disposed in a state where the positions of them in the horizontal direction Dh coincide with each other. As a result, the size of a lubricating oil tank 10A in the horizontal direction Dh can be made smaller than that in a case where the plurality of oil trays 20 are disposed to be shifted in the horizontal direction Dh, as in the first embodiment. Therefore, the lubricating oil tank 10A can be made compact.

Second Embodiment

Next, a second embodiment of the lubricating oil tank and the rotating machine system according to the present disclosure will be described. In the second embodiment which will be described below, the same components as those in the first embodiment will be denoted by the same reference numerals in the drawing, and a description thereof will be omitted. The second embodiment is different from the first embodiment in that a small tray 41 is provided.

Figure 5:
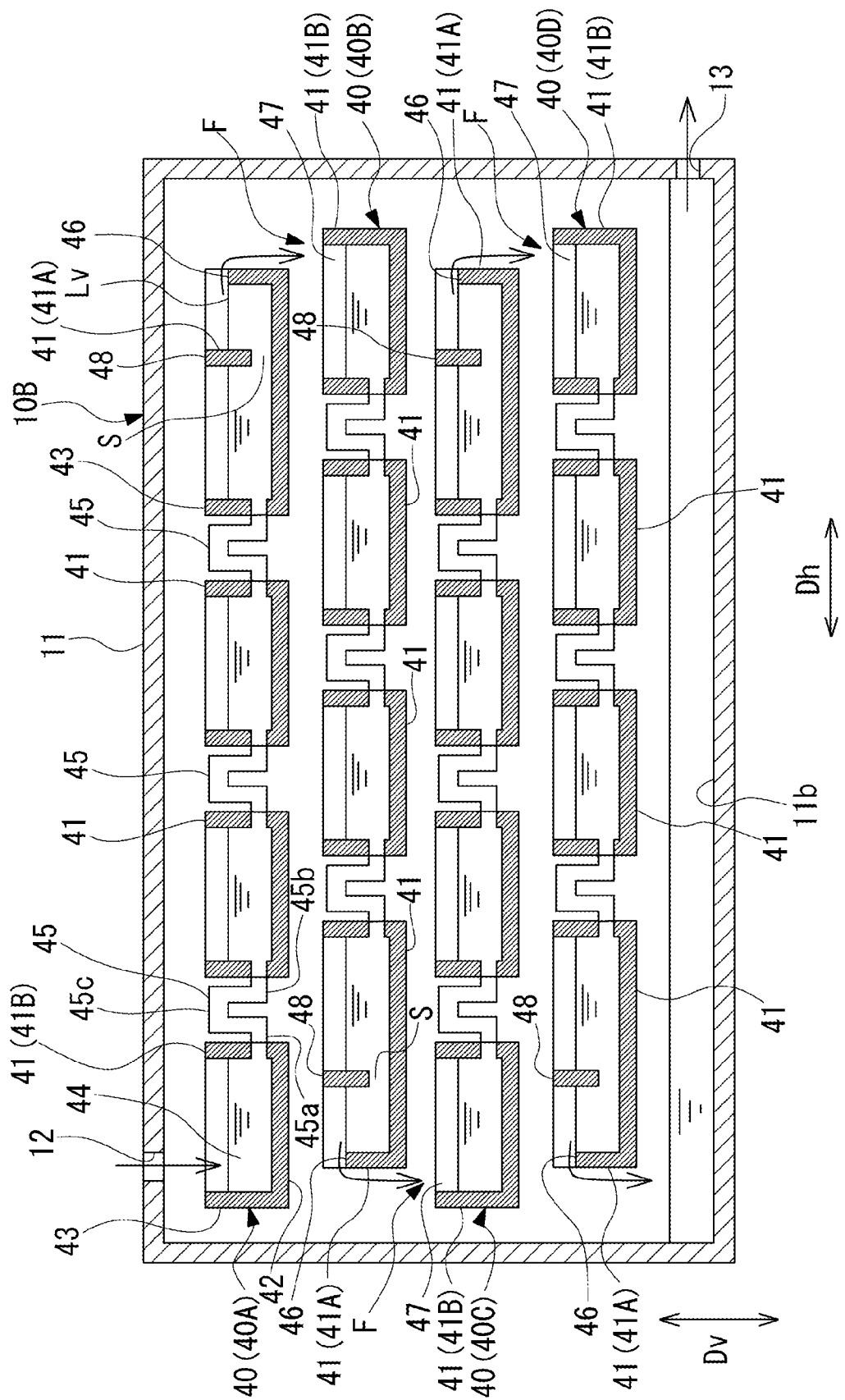
FIG. 5 is a sectional view showing a configuration of a lubricating oil tank according to a second embodiment of the present disclosure.

FIG. 5 is a sectional view showing a configuration of a lubricating oil tank according to the second embodiment of the present disclosure. As shown in FIG. 5, a lubricating oil tank 10B of a compressor system (rotating machine system) 1B in this embodiment includes the tank casing 11, a plurality of oil trays (receiving parts) 40, and the lubricating oil delivery part F.

The plurality of oil trays 40 are disposed between the introduction part 12 and the discharge part 13 in the tank casing 11. The plurality of oil trays 40 are disposed so as to be stacked at intervals with respect to one another in the vertical direction Dv. In this embodiment, for example, four oil trays 40 are provided. Specifically, similarly to the first embodiment, a first oil tray 40A, a second oil tray 40B, a third oil tray 40C, and a fourth oil tray 40D are disposed in order from above in the vertical direction Dv in the tank casing 11.

The oil tray 40 has a plurality of small trays (small receiving parts) 41 disposed side by side in the horizontal direction Dh. That is, the small trays 41 are provided so as to divide the oil tray 40 into a plurality of oil trays in the horizontal direction Dh. The small tray 41 has a small tray bottom surface 42 having a rectangular plate shape, and a small tray peripheral wall portion 43 extending upward from an outer peripheral portion of the small tray bottom surface 42 in the vertical direction Dv. Each of the small trays 41 has a small oil storage space part 44 in which the lubricating oil can be stored by the small tray bottom surface 42 and the small tray peripheral wall portion 43.

In the oil tray 40, the small trays 41 adjacent to each other in the horizontal direction Dh are connected by a connection pipe 45. A first end portion 45a of the connection pipe 45 is connected to one (first) small tray 41 in the horizontal direction Dh. A second end portion 45b of the connection pipe 45 is connected to the other (second) small tray 41 in the horizontal direction Dh. In the connection pipe 45, an intermediate portion 45c is located above the vertical direction Dv with respect to the first end portion 45a and the second end portion 45b. That is, the connection pipe 45 is a pipe formed in a U-shape curved so as to extend upward in the vertical direction Dv and then extend downward.

An overflow portion 46 is formed in a most downstream small tray 41A located at the end portion on the downstream side in the flow direction of the lubricating oil, among the plurality of small trays 41 arranged in the horizontal direction Dh in one oil tray 40. The overflow portion 46 is formed by recessing a part of the small tray peripheral wall portion 43 of the most downstream small tray 41A downward from the upper surface in the vertical direction Dv. In other words, the overflow portion 46 is a cutout formed in the small tray peripheral wall portion 43 of the most downstream small tray 41A. The lubricating oil stored in the small oil storage space part 44 gets over the overflow portion 46 when the liquid level Lv of the lubricating oil becomes equal to or higher than a predetermined level, that is, the height of the overflow portion 46. In this way, the lubricating oil flows out from the most downstream small tray 41A and flows downward in the vertical direction Dv.

An oil receiving portion 47 is formed in a most upstream small tray 41B located at the end portion on the upstream side in the flow direction of the lubricating oil, among the plurality of small trays 41 arranged in the horizontal direction Dh in one oil tray 40. In each of the oil trays 40, the oil receiving portion 47 is disposed on the side opposite to the overflow portion 46 in the horizontal direction.

The overflow portion 46 and the oil receiving portion 47 configure the lubricating oil delivery part F that delivers the lubricating oil from the most downstream small tray 41A disposed in the upper stage in the vertical direction Dv to the most upstream small tray 41B disposed in the lower stage. That is, the lubricating oil delivery part F is configured by the overflow portion 46 provided in the upper stage oil tray 40 and the oil receiving portion 47 provided in the lower stage oil tray 40.

In the oil tray 40, a small tray partition plate 48 is provided only in the most downstream small tray 41A in which the overflow portion 46 is provided. The small tray partition plate 48 extends from above the liquid level Lv of the lubricating oil in the vertical direction Dv in the most downstream small tray 41A toward below the liquid level Lv in the vertical direction Dv. The small tray partition plate 48 is disposed with the gap S between the small tray partition plate 48 and the small tray bottom surface 42 of the most downstream small tray 41A in the vertical direction Dv.

In the lubricating oil tank 10B as described above, the lubricating oil introduced into the tank casing 11 from the introduction part 12 sequentially passes through the plurality of oil trays 40, is then stored on the bottom portion 11b of the tank casing 11, and is sent out from the discharge part 13. At this time, in each of the oil trays 40, the lubricating oil passes through the plurality of small trays 41 from the most upstream small tray 41B in which the oil receiving portion 47 is formed toward the most downstream small tray 41A in which the overflow portion 46 is formed. The lubricating oil passes through the connection pipe 45 between the small trays 41 adjacent to each other in the horizontal direction Dh. In each of the oil trays 40, the lubricating oil flows out from the overflow portion 46 according to the flow rate of the lubricating oil received in the oil receiving portion 47.

According to the lubricating oil tank 10B and the compressor system 1B as described above, in addition to the same operation and effects as those of the first embodiment described above, the oil tray 40 is substantially divided into a plurality of small trays 41. For this reason, the amount of lubricating oil which is accommodated in each small tray 41 becomes small compared to a case where one oil tray 20 is used as in the first embodiment. In this way, it is possible to further suppress the sway of the lubricating oil stored in the small tray 41 due to vibration or the like from the outside.

Further, the small trays 41 arranged in the horizontal direction Dh are connected through the U-shaped connection pipe 45. For this reason, in order for the lubricating oil to flow into the adjacent small tray 41 beyond the connection pipe 45, a certain amount (the amount in which a head can be secured) of the lubricating oil needs to be stored in the small tray 41 connected to the upstream side with respect the connection pipe 45. Therefore, the lubricating oil can be stored in order from the small tray 41 disposed on the upstream side.

Third Embodiment

Next, a third embodiment of the lubricating oil tank and the rotating machine system according to the present disclosure will be described. In the third embodiment which will be described below, the same components as those in the first and second embodiments will be denoted by the same reference numerals in the drawing, and a description thereof will be omitted.

Figure 6:
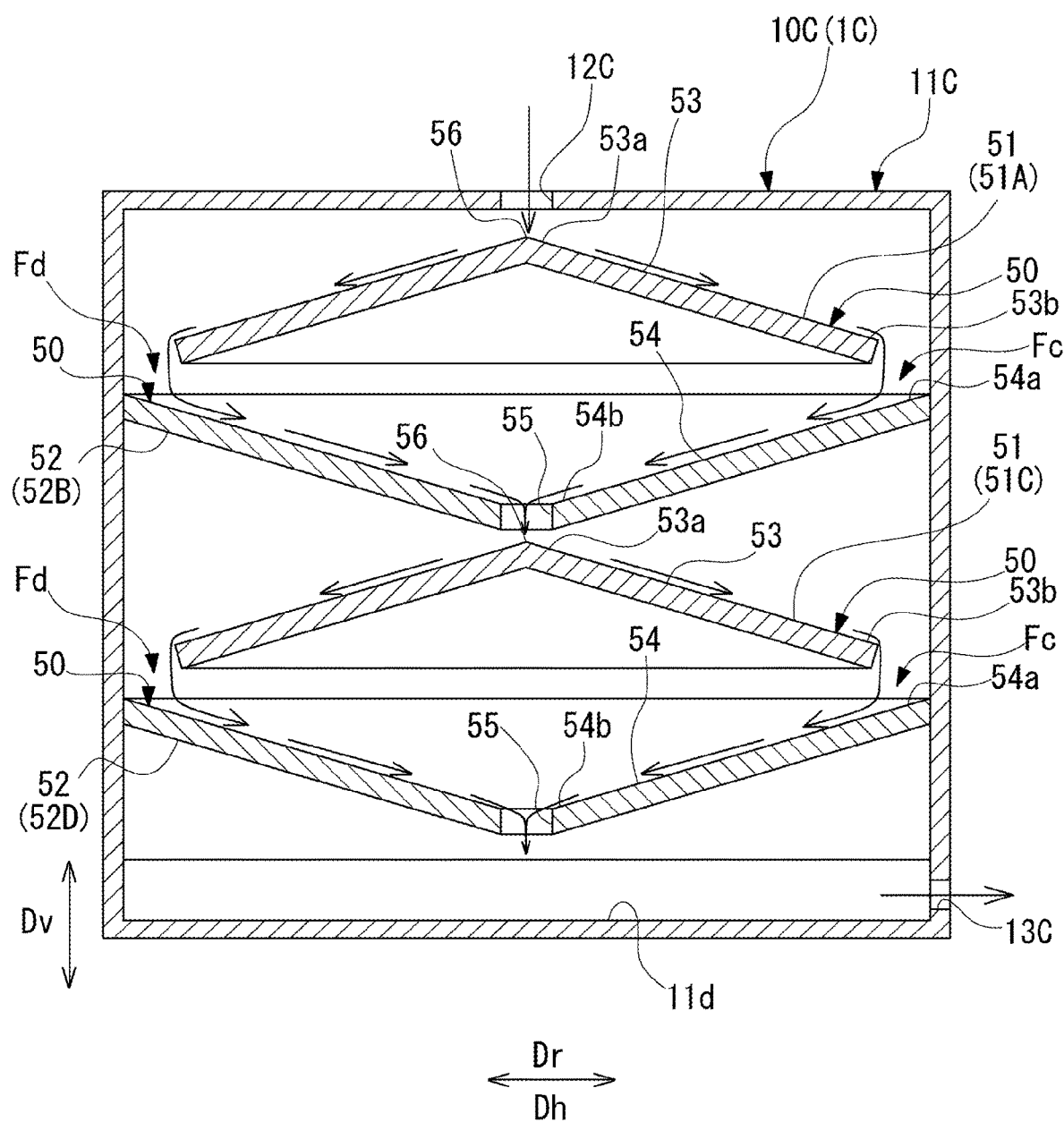
FIG. 6 is a sectional view showing a configuration of a lubricating oil tank according to a third embodiment of the present disclosure.

FIG. 6 is a sectional view showing a configuration of a lubricating oil tank according to the third embodiment of the present disclosure. As shown in FIG. 6, a lubricating oil tank 10C of a compressor system (rotating machine system) 1C in this embodiment includes a tank casing 11C, a plurality of oil receiving members (receiving parts) 50, and lubricating oil delivery parts Fc and Fd.

The tank casing 11C has a hollow box shape. The tank casing 11C is provided with an introduction part 12C into which the lubricating oil is introduced from the return pipe 8 (refer to FIG. 1), and a discharge part 13C through which the lubricating oil is discharged to the pump 6 (refer to FIG.

1). The introduction part 12C is formed at the central portion of the upper surface of the tank casing 11C.

The plurality of oil receiving members 50 are disposed between the introduction part 12C and the discharge part 13C in the tank casing 11C. The plurality of oil receiving members 50 are disposed so as to be stacked with an interval with respect to one another in the vertical direction Dv. The oil receiving member 50 of this embodiment has a convex receiving member 51 and a concave receiving member 52. The convex receiving member 51 and the concave receiving member 52 are located up and down with respect to one another in the vertical direction Dv. In this embodiment, two sets of the convex receiving members 51 and the concave receiving members 52 are provided.

The convex receiving member 51 has a conical shape (or a pyramid shape) whose outer diameter dimension gradually increases from the upper side in the vertical direction Dv toward the lower side. That is, the convex receiving member 51 is a member that is convex upward in the vertical direction Dv. At the central portion of the convex receiving member 51, a central protrusion portion 56 protruding upward in the vertical direction Dv is formed. The convex receiving member 51 has a first inclined surface 53 inclined so as to be directed from the central protrusion portion 56 to the outer side in a radial direction Dr (horizontal direction Dh) from the upper side in the vertical direction Dv toward the lower side.

The concave receiving member 52 has an inverted conical shape (or an inverted pyramid shape) whose outer diameter dimension gradually decreases from the upper side in the vertical direction Dv toward the lower side. That is, the concave receiving member 52 is a member that is concave downward in the vertical direction Dv. At the central portion of the concave receiving member 52, a through-hole 55 penetrating in an up-down direction is formed. That is, the concave receiving member 52 is open at the lower end in the vertical direction Dv. The concave receiving member 52 has a second inclined surface 54 inclined so as to be directed from the outer side in the radial direction Dr (horizontal direction Dh) to the through-hole 55 from the upper side in the vertical direction Dv toward the lower side. The diameter of the concave receiving member 52 is formed larger than the diameter of the convex receiving member 51. In this way, an upper end portion 54a of the second inclined surface 54 is disposed below a lower end portion 53b of the convex receiving member 51 located on the upper stage side with respect to the concave receiving member 52 in the vertical direction Dv and further on the outer side in the radial direction Dr than the lower end portion 53b.

In the lubricating oil tank 10C as described above, the lubricating oil introduced into the tank casing 11C from the introduction part 12C sequentially passes through the plurality of oil receiving members 50, is then stored on a bottom portion 11d of the tank casing 11C, and is sent out from the discharge part 13C.

Specifically, the lubricating oil introduced into the tank casing 11C from the introduction part 12C flows on the first inclined surface 53 so as to spread from the central protrusion portion 56 of a first convex receiving member 51A of the first stage located below the introduction part 12C to the outer side in the radial direction Dr as it goes downward in the vertical direction Dv. The lubricating oil flows down from the lower end portion 53b of the first inclined surface 53 to the upper end portion 54a of the second inclined surface 54 of a first concave receiving member 52B of the second stage located below. In the first concave receiving member 52B, the lubricating oil flows on the second inclined surface 54 so as to be gathered inside in the radial direction Dr from the upper end portion 54a of the second inclined surface 54. The lubricating oil flows down from the through-hole 55 formed in a lower end portion 54b of the second inclined surface 54 to a second convex receiving member 51C of the third stage.

The lubricating oil flows on the first inclined surface 53 from the central protrusion portion 56 of the second convex receiving member 51C. The lubricating oil flows down from the lower end portion 53b of the first inclined surface 53 to the upper end portion 54a of the second inclined surface 54 of a second concave receiving member 52D of the fourth stage located below. In the second concave receiving member 52D, the lubricating oil flows on the second inclined surface 54 and flows down from the through-hole 55 formed in the lower end portion 54b of the second concave receiving member 52D to the bottom portion 11d of the tank casing 11C.

The lubricating oil delivery part Fc is configured by the lower end portion 53b of the first inclined surface 53 and the upper end portion 54a of the second inclined surface 54. The lubricating oil delivery part Fc delivers the lubricating oil from the convex receiving member 51 disposed in the upper stage to the concave receiving member 52 disposed in the lower stage. Further, the lubricating oil delivery part Fd is configured by the through-hole 55 and the central protrusion portion 56. The lubricating oil delivery part Fd delivers the lubricating oil from the concave receiving member 52 disposed in the upper stage to the convex receiving member 51 disposed in the lower stage.

According to the lubricating oil tank 10C and the compressor system 1C as described above, the lubricating oil introduced into the tank casing 11C from the introduction part 12C sequentially passes through the plurality of oil receiving members 50, is then stored on the bottom portion 11d of the tank casing 11C, and is sent out from the discharge part 13. In the process of passing through the plurality of oil receiving members 50, the lubricating oil flows on the first inclined surface 53 or the second inclined surface 54 with a minimum film thickness. In the process in which the lubricating oil flows on the first inclined surface 53 or the second inclined surface 54, the air bubbles gradually escape. The film thickness (minimum film thickness) of the lubricating oil flowing on the first inclined surface 53 or the second inclined surface 54 is significantly smaller than the height to the liquid level Lv in a case where the lubricating oil is stored in the oil trays 20 and 40 as in the first and second embodiments, and thus the air bubbles efficiently escape. Therefore, the degassing speed can be greatly increased.

Further, similar to the first embodiment or the second embodiment, the plurality of oil receiving members 50 are provided, whereby the flow rate of the lubricating oil flowing in one oil receiving member 50 is reduced. Therefore, the time required for the air bubbles to escape is shortened, and thus the degassing speed can be further increased.

In the third embodiment, the first inclined surface 53 is formed on the convex receiving member 51, and the second inclined surface 54 is formed on the concave receiving member 52. However, the first inclined surface 53 or the second inclined surface 54 is not limited to the shape as in the third embodiment. It is acceptable if the first inclined surface 53 is inclined from the upper side in the vertical direction Dv toward the lower side. Further, it is acceptable if the second inclined surface 54 is inclined in a different direction from the first inclined surface 53 located in the upper stage from the upper side in the vertical direction Dv toward the lower side. Therefore, for example, the first inclined surface may be inclined from the upper side in the vertical direction Dv toward the lower side and from one side to the other side in the horizontal direction Dh. At this time, it is preferable that the second inclined surface is inclined from upper side in the vertical direction Dv toward the lower side and from the other side to one side in the horizontal direction Dh.

While some embodiments have been described and illustrated above, it should be understood that these are exemplary of the disclosure and are not to be considered as limiting. Additions, omissions, substitutions, and other modifications can be made without departing from the spirit or scope of the present disclosure. Accordingly, the disclosure is not to be considered as being limited by the positive description, and is only limited by the scope of the appended claims.

For example, in the embodiments described above, the compressor system 1 provided with the compressor main body 2 as the rotating machine main body is exemplified. However, the rotating machine system is not limited thereto. For example, the rotating machine system may be provided with a turbine or a motor as a rotating machine main body.

Further, the number of the oil trays 20 and 40 or the number of the oil receiving members 50 is not limited to four as in this embodiment, and may be appropriately set as necessary.

EXPLANATION OF REFERENCES 1, 1B, 1C: compressor system (rotating machine system)
2: compressor main body (rotating machine main body)
2a: rotor
3, 4: bearing
5: lubricating oil supply device
6: pump
7: feed pipe
8: return pipe
10, 10B, 10C: lubricating oil tank
11, 11C: tank casing
11b, 11d: bottom portion
12, 12C: introduction part
13, 13C: discharge part
20, 20E, 40: oil tray (receiving part)
20A, 40A: first oil tray
20B, 40B: second oil tray
20C, 40C: third oil tray
20D, 40D: fourth oil tray
21: bottom surface
22: peripheral wall portion
23: oil storage space part
24, 47: oil receiving portion
24A: first oil receiving portion
24B: second oil receiving portion
24C: third oil receiving portion
24D: fourth oil receiving portion
25, 46: overflow portion
25A: first overflow portion
25B: second overflow portion
25C: third overflow portion
25D: fourth overflow portion
26: partition plate
41: small tray (small receiving part)
41A: most downstream small tray
41B: most upstream small tray
42: small tray bottom surface
43: small tray peripheral wall portion
44: small oil storage space part
45: connection pipe
45a: first end portion
45b: second end portion
45c: intermediate portion
50: oil receiving member (receiving part)
51: convex receiving member
51A: first convex receiving member
51C: second convex receiving member
52: concave receiving member
52B: first concave receiving member
52D: second concave receiving member
53: first inclined surface
53a: upper end portion
53b: lower end portion
54: second inclined surface
54a: upper end portion
54b: lower end portion
55: through-hole
56: central protrusion portion
Dh: horizontal direction
Dr: radial direction
Dv: vertical direction
F, Fc, Fd: lubricating oil delivery part
Lv: liquid level
S: gap

What is claimed is:

1. A lubricating oil tank comprising:
   a tank casing having an introduction part into which lubricating oil is introduced and a discharge part through which the lubricating oil is discharged;
   a plurality of receiving parts which are disposed between the introduction part and the discharge part in the tank casing and which is configured to receive the lubricating oil introduced from the introduction part; and
   a lubricating oil delivery part which is configured to deliver the lubricating oil from one of the plurality of receiving parts to another one of the plurality of receiving parts between the plurality of receiving parts, wherein
   at least one of the plurality of receiving parts includes a plurality of small receiving parts disposed side by side in a horizontal direction.

2. The lubricating oil tank according to claim 1, wherein the plurality of receiving parts are oil trays that is configured to store the lubricating oil, and are disposed at intervals with respect to one another in a vertical direction.

3. The lubricating oil tank according to claim 2, wherein at least one of the plurality of receiving parts further includes a partition plate which extends downward from above a liquid level of the lubricating oil in at least one of the plurality of receiving parts in the vertical direction and is disposed with a gap between the partition plate and a bottom surface of at least one of the plurality of receiving parts in the vertical direction.

4. The lubricating oil tank according to claim 2, wherein the lubricating oil delivery part further includes:
   an overflow portion which is formed in the one of the plurality of receiving parts, and in which the lubricating oil is configured to flow out when a liquid level of the lubricating oil in the one of the plurality of receiving parts reaches a predetermined level, and
   an oil receiving portion which is formed in another one of the plurality of receiving parts disposed below the one of the plurality of receiving parts in the vertical direction and is configured to receive the lubricating oil flowing out from the overflow portion.

5. A rotating machine system comprising:
a rotating machine main body; and
the lubricating oil tank according to claim 1, which is configured to store lubricating oil which is supplied to the rotating machine main body.

6. A lubricating oil tank comprising:
a tank casing having an introduction part into which lubricating oil is introduced and a discharge part through which the lubricating oil is discharged;
a plurality of receiving parts which are disposed between the introduction part and the discharge part in the tank casing and which is configured to receive the lubricating oil introduced from the introduction part; and
a lubricating oil delivery part which is configured to deliver the lubricating oil from one of the plurality of receiving parts to another one of the plurality of receiving parts between the plurality of receiving parts, wherein
the plurality of receiving parts are oil trays that is configured to store the lubricating oil, and are disposed at intervals with respect to one another in a vertical direction, and
at least one of the plurality of receiving parts further includes a partition plate which extends downward from above a liquid level of the lubricating oil in at least one of the plurality of receiving parts in the vertical direction and is disposed with a gap between the partition plate and a bottom surface of at least one of the plurality of receiving parts in the vertical direction.

* * * * *